US012613577B2

(12) United States Patent
Kamarajugadda et al.

(10) Patent No.: US 12,613,577 B2
(45) Date of Patent: Apr. 28, 2026

(54) WEARABLE RING DEVICE WITH ROTATING INTERFACE FOR PERFORMING COMMUNICATION OPERATION

(71) Applicant: CONZUMEX INDUSTRIES PRIVATE LIMITED, Bangalore (IN)

(72) Inventors: Prathyusha Kamarajugadda, Bangalore (IN); Kln Sai Prasanth, Bangalore (IN)

(73) Assignee: CONZUMEX INDUSTRIES PRIVATE LIMITED, Bangalore (IN)

( * ) Notice: Subject to any disclaimer, the term of this patent is extended or adjusted under 35 U.S.C. 154(b) by 0 days.

(21) Appl. No.: 18/778,969

(22) Filed: Jul. 20, 2024

(65) Prior Publication Data

US 2025/0028391 A1    Jan. 23, 2025

(30) Foreign Application Priority Data

Jul. 21, 2023    (IN) .............................. 202341049410
Jul. 9, 2024    (IN) .............................. 202441052507

(51) Int. Cl.
| | |
|---|---|
| *G06F 3/01* | (2006.01) |
| *G06F 1/16* | (2006.01) |
| *G06F 3/0362* | (2013.01) |

(52) U.S. Cl.
CPC .............. *G06F 3/014* (2013.01); *G06F 1/163* (2013.01); *G06F 3/016* (2013.01); *G06F 3/0362* (2013.01)

(58) Field of Classification Search
CPC ........ G06F 3/014; G06F 3/016; G06F 3/0362; G06F 1/163
See application file for complete search history.

(56) References Cited

U.S. PATENT DOCUMENTS

| | | | |
|---|---|---|---|
| 9,775,520 B2 | 10/2017 | Tran | |
| 9,983,728 B2 * | 5/2018 | Dow | ..................... G06F 3/0227 |
| 10,317,940 B2 | 6/2019 | Eim et al. | |

(Continued)

FOREIGN PATENT DOCUMENTS

| | | |
|---|---|---|
| CN | 204856056 U | 12/2015 |
| CN | 208126117 U | 11/2018 |

(Continued)

*Primary Examiner* — Christopher E Leiby

(57) ABSTRACT

This patent application relates to wearable ring device (101) to perform communication operation in wireless network. The wearable ring device comprises control unit (107), static component (105) and rotatable interface (103). The control unit comprises microcontroller, haptic controller and power source. Static component placed over control unit. The static component includes sensing element placed over outer surface of static component. Rotatable interface is mounted over static component and is rotatable over axis of static component. The rotatable interface includes notch, where notch is provided at inner surface of rotatable component. Further, when rotatable interface is rotated over static component, conductive notch comes in contact with sensing element. Microcontroller determines change in level of electric or magnetic or optical parameter of sensing element when rotatable interface is in contact with static component and performs communication operation based on change in level of electric or magnetic or optical parameter of sensing element.

24 Claims, 9 Drawing Sheets

(56)          References Cited

U.S. PATENT DOCUMENTS

| | | | | |
|---|---|---|---|---|
| 10,509,994 | B1 | 12/2019 | Huynh | |
| 10,528,715 | B2 | 1/2020 | Fukuda | |
| 10,572,794 | B2 | 2/2020 | Dandamudi | |
| 10,635,173 | B2 | 4/2020 | Lim et al. | |
| 10,871,837 | B2 | 12/2020 | Pastorino | |
| 11,086,275 | B2 | 8/2021 | Chen et al. | |
| 11,714,494 | B2 | 8/2023 | D'Amone et al. | |
| 11,733,790 | B2 * | 8/2023 | Beyhs | H03K 17/97 |
| | | | | 345/184 |
| 11,903,674 | B2 | 2/2024 | Fukuda | |
| 2012/0075173 | A1 * | 3/2012 | Ashbrook | G06F 3/0362 |
| | | | | 345/156 |
| 2015/0147065 | A1 * | 5/2015 | Civelli | G08C 23/04 |
| | | | | 398/107 |
| 2017/0147033 | A1 | 5/2017 | Pastorino | |
| 2017/0269687 | A1 * | 9/2017 | Hussain | G06F 3/0485 |
| 2018/0260064 | A1 | 9/2018 | Chae et al. | |
| 2019/0080220 | A1 * | 3/2019 | Dandamudi | G06K 19/07773 |

| | | | | |
|---|---|---|---|---|
| 2019/0131812 | A1 | 5/2019 | Lee et al. | |
| 2019/0155385 | A1 * | 5/2019 | Lim | G06F 3/033 |
| 2020/0234596 | A1 * | 7/2020 | Szczerba | H04W 4/024 |
| 2021/0055697 | A1 | 2/2021 | Abramov | |
| 2021/0096657 | A1 * | 4/2021 | D'Amone | G06F 3/014 |
| 2022/0091683 | A1 * | 3/2022 | Beyhs | G06F 3/0362 |
| 2022/0110547 | A1 | 4/2022 | Kinnunen et al. | |
| 2022/0233142 | A1 | 7/2022 | Hasan et al. | |
| 2022/0342437 | A1 * | 10/2022 | Xie | F24C 7/082 |
| 2023/0350503 | A1 * | 11/2023 | D'Amone | G06F 3/017 |
| 2025/0000218 | A1 * | 1/2025 | Lämsä | A61B 5/02438 |
| 2025/0009086 | A1 * | 1/2025 | Mäkinen | A44C 9/02 |

FOREIGN PATENT DOCUMENTS

| | | |
|---|---|---|
| CN | 112416131 A | 2/2021 |
| CN | 112540686 A | 3/2021 |
| TW | I457962 B | 10/2014 |
| TW | I791291 B | 2/2023 |
| WO | 2022198307 A1 | 9/2022 |

* cited by examiner

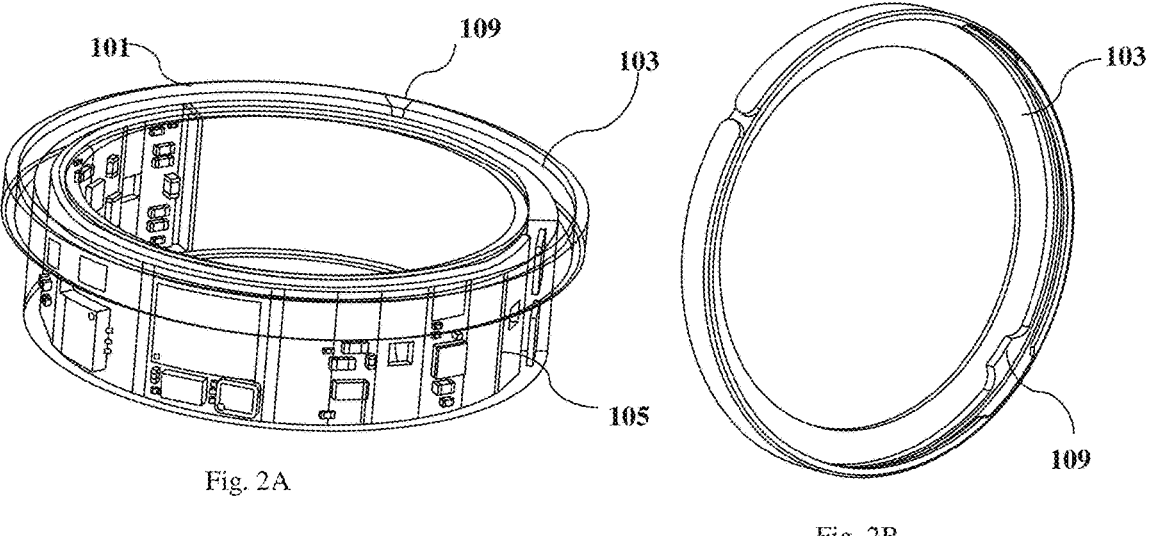
Fig. 2A
Fig. 2B
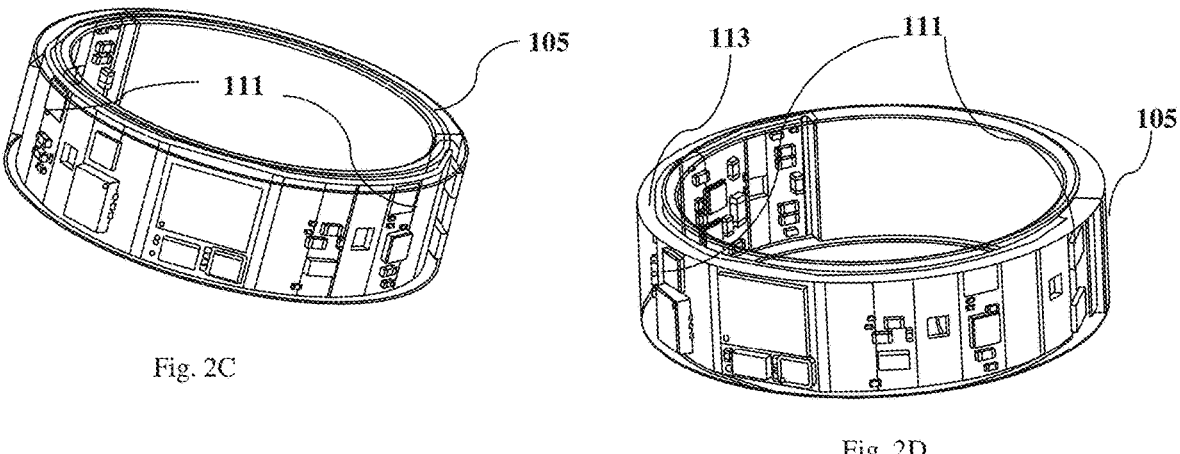
Fig. 2C
Fig. 2D

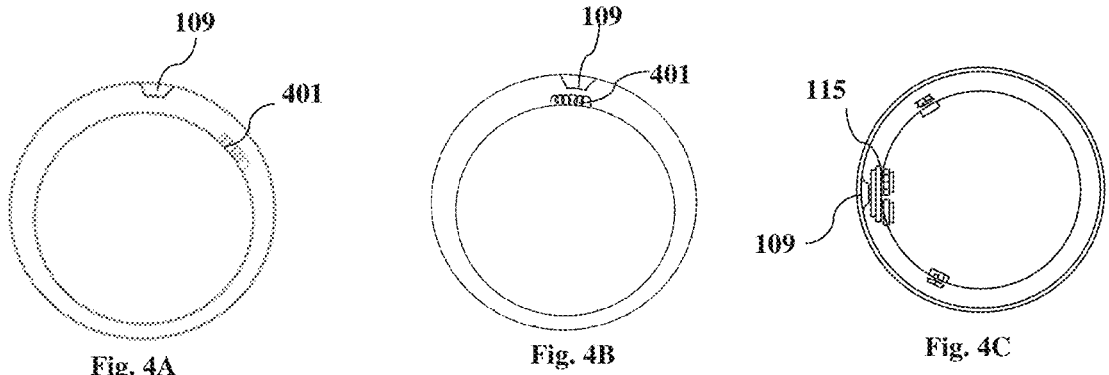
Fig. 4A                    Fig. 4B                    Fig. 4C
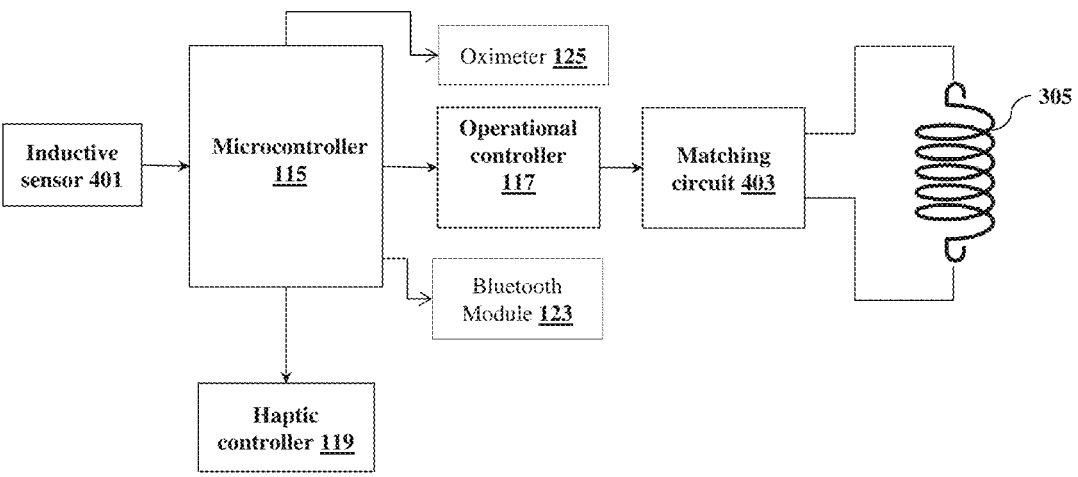
Fig. 4D
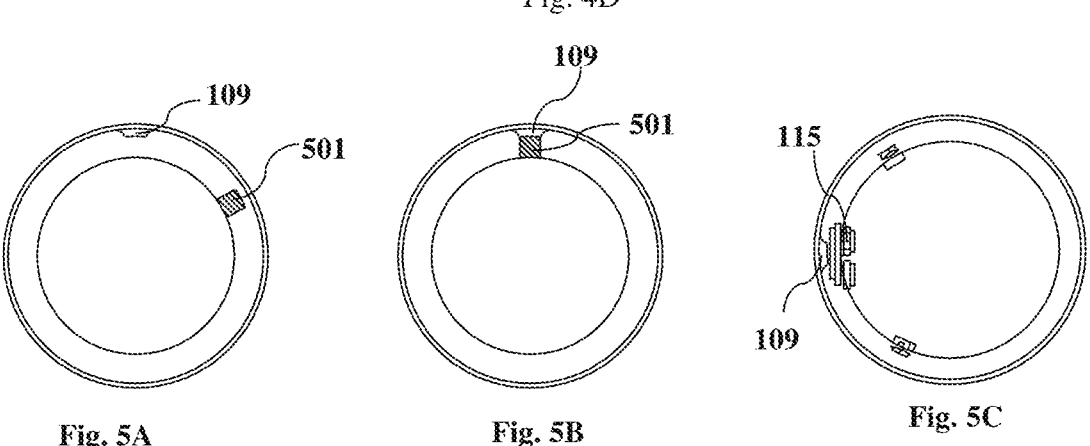
Fig. 5A                    Fig. 5B                    Fig. 5C

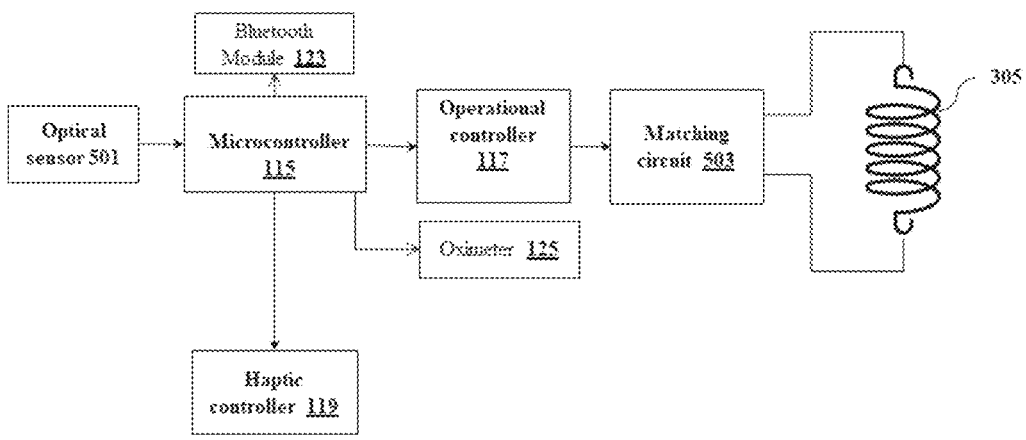
Fig. 5D
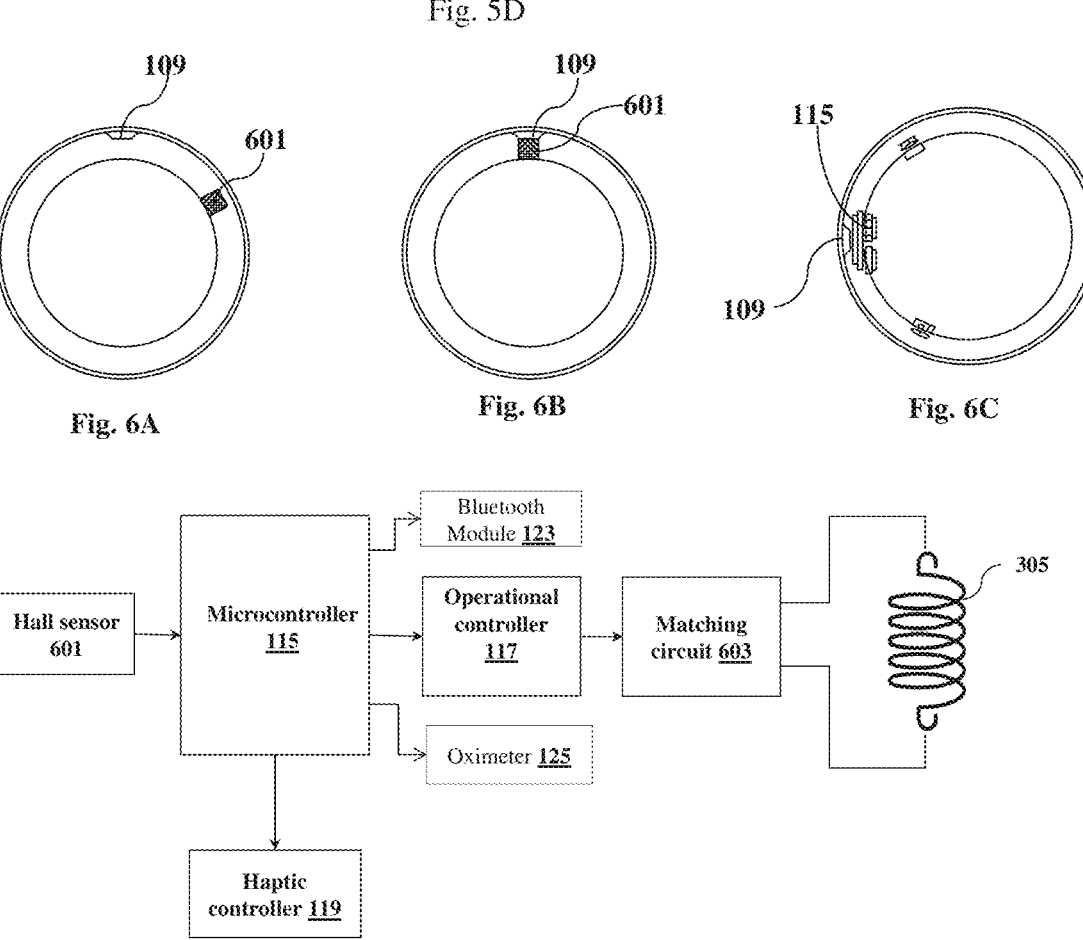
Fig. 6A
Fig. 6B
Fig. 6C
Fig. 6D

Fig. 7A                    Fig. 7B                    Fig. 7C

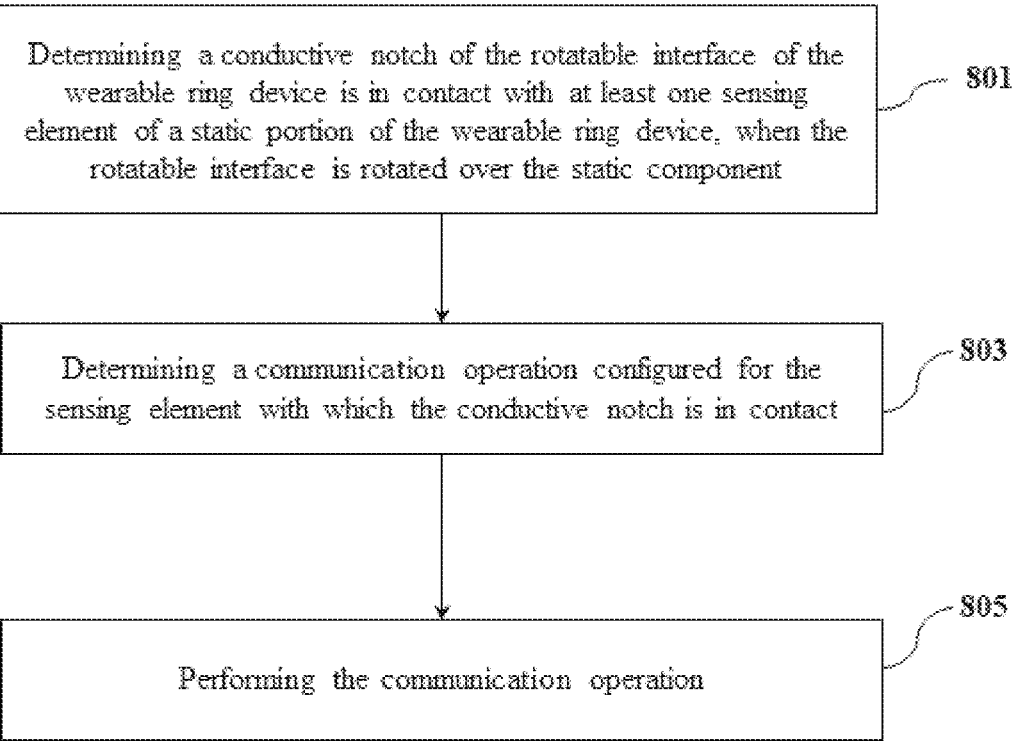

Determining a conductive notch of the rotatable interface of the wearable ring device is in contact with at least one sensing element of a static portion of the wearable ring device, when the rotatable interface is rotated over the static component          ~ 801

Determining a communication operation configured for the sensing element with which the conductive notch is in contact          ~ 803

Performing the communication operation          ~ 805

WEARABLE RING DEVICE WITH ROTATING INTERFACE FOR PERFORMING COMMUNICATION OPERATION

CROSS-REFERENCE TO RELATED APPLICATIONS

The present application claims priority from Indian Provisional Application Nos. 20/234,1049410 filed on 21 Jul. 2023, and 202441052507 filed on 9 Jul. 2024 all of which are incorporated herein by reference.

FIELD OF THE INVENTION

This application is based on and derives the benefit of Indian Provisional Application 20/234,1049410 filed on 21 Jul. 2023 and 202441052507 filed on 9 Jul. 2024, and cognate complete specification filed on 16 Jul. 2024 the contents of which are incorporated herein by reference. The proposed embodiments relate to a wearable technology and embedded systems. More particularly, the present disclosure relates to a wearable ring device with a rotating interface for performing communication operation.

BACKGROUND OF INVENTION

Smart rings have become increasingly popular in recent years due to their convenience and portability. These small devices can perform a range of functions, from tracking fitness and health data to making payments and controlling smart home devices. However, the small size of smart rings has posed a significant challenge in terms of designing effective user interfaces. While larger wearable devices such as smartwatches can incorporate touchscreens, buttons, and other user interface elements, these options are often unsuitable for smart rings due to their size constraints.

To address this challenge, designers and engineers have been exploring alternative user interface mechanisms that can be incorporated into smart ring designs. Some of these mechanisms include voice commands, gesture recognition, and haptic feedback. Voice commands allow users to control their smart rings using spoken commands, while gesture recognition enables users to control their devices using hand movements. Haptic feedback, on the other hand, provides physical feedback to users through vibrations or other sensory cues.

Despite these innovative solutions, there is still a need for a compact yet user-friendly interface mechanism that can be seamlessly integrated into smart ring designs. This is particularly important as the scope of features that can be offered to users in this form factor is largely dependent on the effectiveness of the user interface. As such, designers and engineers must continue to explore new and innovative ways to incorporate user interfaces into smart rings, ensuring that these devices remain both functional and user-friendly.

It is desired to address the above-mentioned disadvantages or other shortcomings or at least provide a useful alternative.

OBJECT OF INVENTION

The principal object of the embodiments herein is to provide a wearable ring device to perform a communication operation in a wireless network.

Another object of the invention is to provide a wearable ring device with a rotating interface for performing Communication operation.

Yet another object of the invention is to provide a wearable ring device comprising a rotatable interface with a notch and a sensing element within the static component.

Yet another objective of the embodiments herein is to provide a wearable ring device comprising a rotatable interface to switch between the different modes of operation. The different modes of operation can include, but not limited to a payment mode, workout mode, music control mode, emergency mode, and health monitoring mode.

Yet another objective of the embodiments herein is to track the position of the notch using the sensing element when the rotatable interface is turned, facilitating multiple switch actions. This innovative interface mechanism overcomes the limitations of small form factor wearable devices by enabling easy and effective user interaction.

BRIEF SUMMARY OF THE INVENTION

In one aspect, the objectives are achieved by providing a wearable ring device to perform a communication operation in a wireless network. The wearable ring device comprises a control unit, a static component and a rotatable interface. The control unit comprises a microcontroller, a haptic controller and a power source. The static component is placed over the control unit and the static component includes at least one sensing element placed over an outer surface of the static component. Further, the rotatable interface mounted over the static component and is rotatable over an axis of the static component. The rotatable interface comprises a notch and the notch is provided at an inner surface of the rotatable component. Further, when the rotatable interface is rotated over the static component, the conductive notch comes in contact with the sensing element, the microcontroller determines a change in an electric or magnetic or optical parameter of the sensing element when the rotatable interface is in contact with the static component and performs the communication operation based on the change in the electric or magnetic or optical parameter of the sensing element.

In an embodiment, the sensing element is one of a capacitive sensor, a magnetic sensor, an inductive sensor, an optical sensor, and a pressure sensor.

In an embodiment, the notch is made of a conductive material that allows for the flow of electrical current from the power source.

In an embodiment, to perform the communication operation based on the change in the level of electric or magnetic or optical parameter of the sensing element includes to determine whether the change in the level of electric or magnetic or optical parameter of the sensing element meets a predetermined threshold. Further, performs the communication operation based on the change in the level of electric or magnetic or optical parameter of the sensing element when the change in the level of electric or magnetic or optical parameter sensing element meets the predetermined threshold.

In an embodiment, the capacitive sensor on the static component is associated with at least one capacitive sensing pad, wherein the cap sensing pad generates a capacitance due to rotations of the rotatable interface over the static component. Further, determines the change in the capacitance of the sensor In an embodiment, the inductive sensor on the static component is associated with at least one inductive coil that generates an inductance due to rotations of the rotatable interface over the static component. Further, determines the change in the inductance from a predefined threshold value indicating the contact of the conductive notch with the inductive sensor.

In an embodiment, the hall sensor on the static component is associated with at least one hall-effect sensor that generates a voltage due to rotations of the magnetic rotatable interface over the static component. Further, determines the change in the magnetic field generated by the magnetic notch.

In an embodiment, the optical sensor on the static component is associated with at least one LEDs-a PD pair to determine the change in the optical path of a light emitted by the LEDs, which is reflected back from to PD pair from conductive notch due the rotations of the rotatable interface over the static component.

In an embodiment, the pressure sensor on the static component comprises a strain gauge attached to the static component that measures the deformation of the static component caused by the pressure applied by the rotatable interface when the rotatable interface is rotated over the static component. The deformation of the strain gauge causes a change in resistance that is determined by the pressure sensor. Further, determines the change in the resistance applied over the static component.

In an embodiment, the communication operations comprises at least one of a payment operation, a workout operation, an emergency operation, an access control operation, a gaming operation, and a multimedia playback operation.

In an embodiment, the rotatable interface is circular in shape with a radial thickness.

In an embodiment, the rotatable interface is made of at least one of a metallic material, non-metallic material or a semi-metallic material.

In an embodiment, a potting material between the static component and the rotatable interface. The potting material is a protective material surrounding the static component.

In an embodiment, the potting material behaves as a dielectric material when the sensing element is the capacitive sensor.

In an embodiment, the communication operation is performed only when a user is wearing the wearable ring device.

In an embodiment, the haptic controller provides haptic feedback indicating enabling or disabling of the communication operation on the wearable ring device.

In an embodiment, the power source supplies power to the wearable ring device to perform the communication operations.

In an embodiment, the notch is at least one of a conductive notch or a magnetic notch.

Accordingly, the embodiment herein is to provide a method for performing communication operation includes determining, by a wearable ring device, a conductive notch of the rotatable interface of the wearable ring device is in contact with at least one sensing element of a static portion of the wearable ring device, when the rotatable interface is rotated over the static component. Further, the method includes determining, by the wearable ring device, a communication operation configured for the sensing element with which the conductive notch is in contact. Further, the method includes performing, by the wearable ring device, the communication operation.

In an embodiment, the method for performing the communication operation includes determining whether the change in the level of electric or magnetic or optical parameter of the sensing element meets a predetermined threshold.

Further, the method includes performing the communication operation based on the change in the level of electric or magnetic or optical parameter of the sensing element when the change in the level of electric or magnetic or optical parameter of the sensing element meets the predetermined threshold.

In an embodiment, the capacitive sensor on the static component is associated with at least one capacitive sensing pad, generating a capacitance due to rotations of the rotatable interface over the static component. Further, the method includes determining the change in the capacitance of the sensing element due to the rotating notch.

In an embodiment, the inductive sensor on the static component is associated with at least one inductive coil includes generating an inductance due to rotations of the rotatable interface over the static component. Further, the method includes determining the change in the inductance from a predefined threshold value indicating the contact of the conductive notch with the inductive sensor.

In an embodiment, the hall sensor on the static component is associated with at least one hall-effect sensor that generates a voltage due to rotations of the magnetic rotatable interface over the static component. Further, the method includes determining the change in the magnetic field detected by the hall sensor.

In an embodiment, the optical sensor on the static component is associated with at least one LEDs-a PD pair includes determining the change in the optical path of a light emitted by the LEDs, which is reflected back from to PD pair from conductive notch due the rotations of the rotatable interface over the static component.

In an embodiment, wherein the pressure sensor on the static component comprises a strain gauge attached to the static component includes measuring the deformation of the static component caused by the pressure applied by the rotatable interface when the rotatable interface is rotated over the static component. The deformation of the strain gauge causes a change in resistance that is determined by the pressure sensor. Further, the method includes determining the change the resistance applied over the static component.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications be made within the scope of the embodiments herein.

DESCRIPTION OF THE DRAWINGS

These and other features, aspects, and advantages of the present embodiments are illustrated in the accompanying drawings, throughout which like reference letters indicate corresponding parts in the various figures. The embodiments herein will be better understood from the following description with reference to the drawings, in which.

5

FIG. 2C is a schematic figure that illustrates a static component of the wearable ring device, according to the embodiments disclosed herein.

FIG. 2D is a schematic figure that illustrates a dielectric part placed between the static component and rotatable interface, according to the embodiments disclosed herein.

Figure 2E:
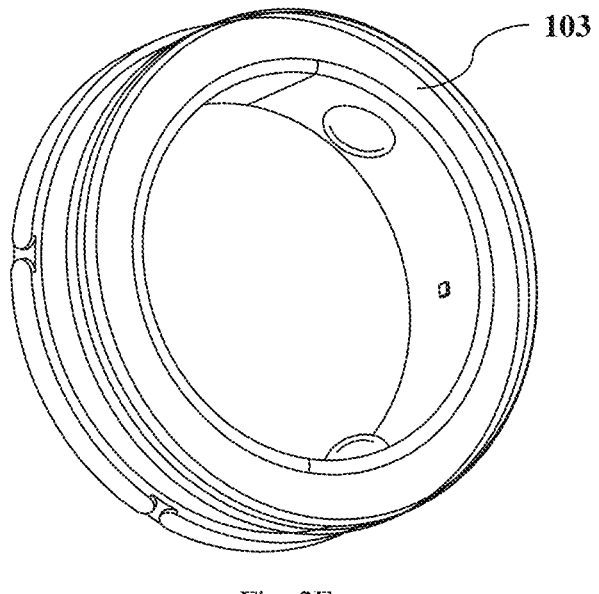
FIG. 2A is a schematic figure that illustrates a side view of the wearable ring device, according to the embodiments disclosed herein.
FIG. 2B is a schematic figure that illustrates a rotatable interface of the wearable ring device, according to the embodiments disclosed herein.

FIG. 2E is a schematic figure that illustrates a front view of the wearable ring device, according to the embodiments disclosed herein.

Figure 2F:
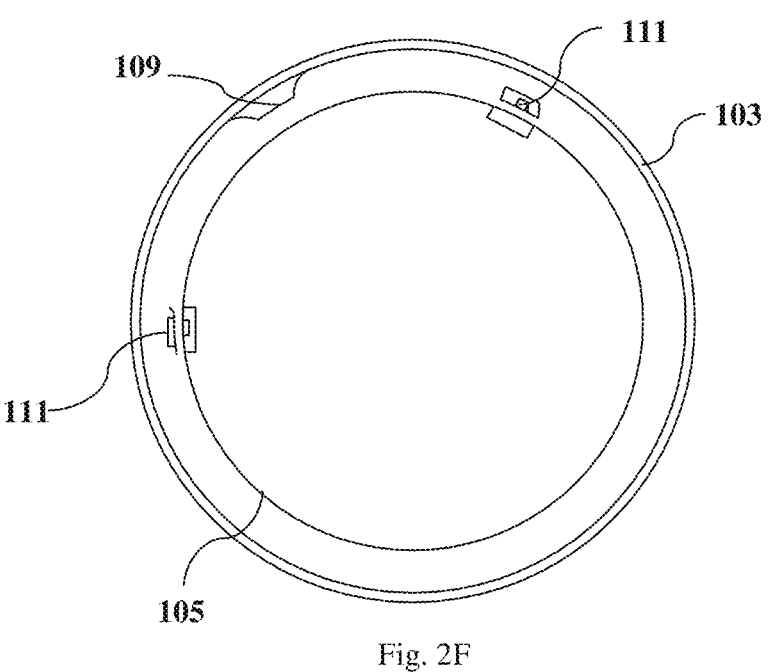

FIG. 2F is a schematic figure that illustrates a top view of the rotatable interface on the wearable ring device, according to the embodiments disclosed herein.

Figure 2G:
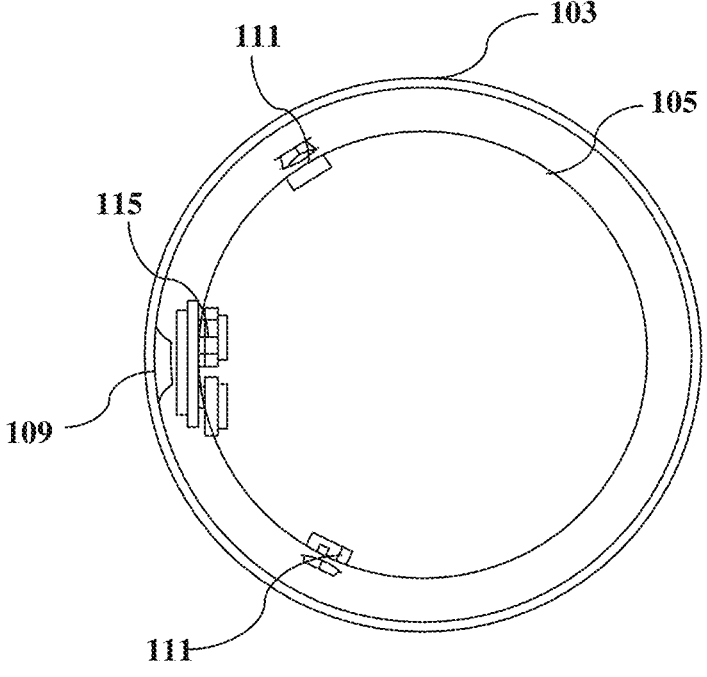

FIG. 2G is a schematic figure that illustrates a bottom view of the rotatable interface with a capacitive sensor and microcontroller according to the embodiments disclosed herein.

Figure 2H:
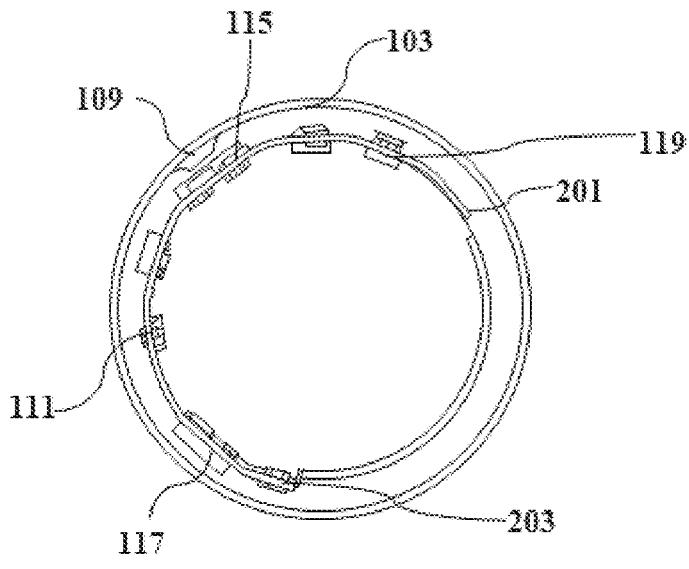

FIG. 2H is a schematic figure that illustrates a trackpad bottom view of the static component, according to the embodiments disclosed herein.

Figure 2I:
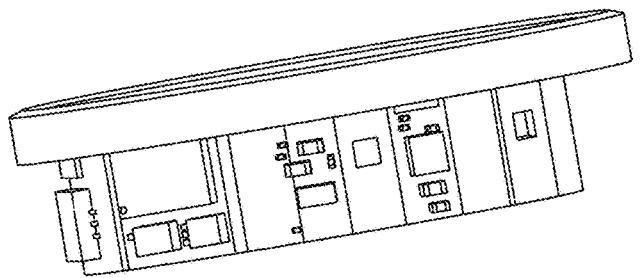

FIG. 2I is a schematic figure that illustrates a side view of the trackpad, according to the embodiments disclosed herein.

Figures 3A, 3B, 3C:
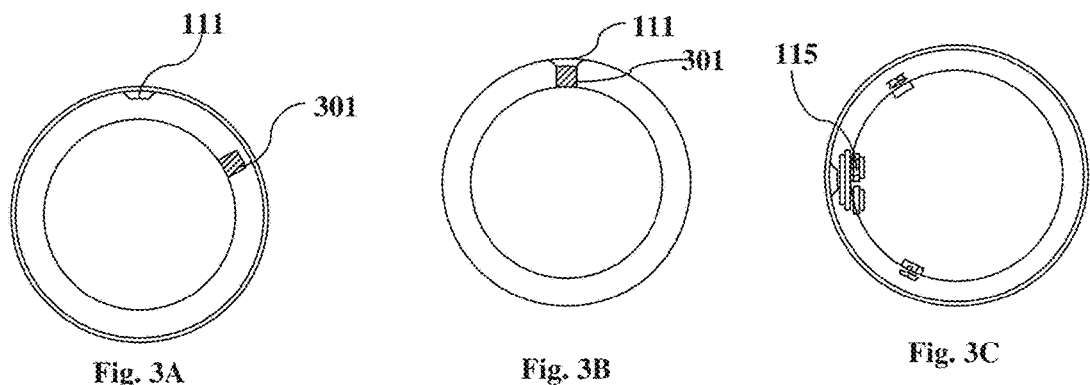

FIG. 3A-3C are schematic figures that illustrate the working of the wearable ring device while rotating the rotatable interface over the capacitive sensor, according to the embodiments disclosed herein.

Figure 3D:
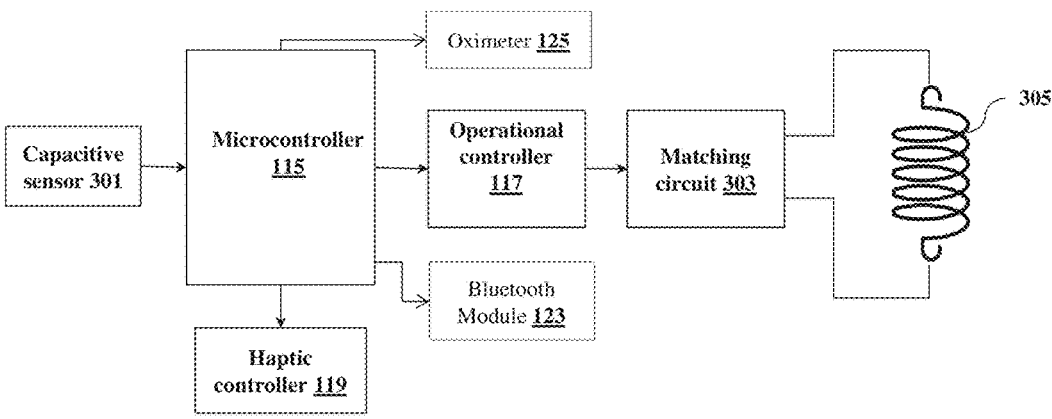

FIG. 3D is an electronic circuit that illustrates the working of the wearable ring device while rotating the rotatable interface over the capacitive sensor, according to the embodiments disclosed herein.

FIG. 4A-4C are schematic figures that illustrate the working of the wearable ring device while rotating the rotatable interface over the inductive sensor, according to the embodiments disclosed herein.

FIG. 4D is an electronic circuit that illustrates the working of the wearable ring device while rotating the rotatable interface over the inductive sensor, according to the embodiments disclosed herein.

FIG. 5A-5C are schematic figures that illustrate the working of the wearable ring device while rotating the rotatable interface over the optical sensor, according to the embodiments disclosed herein.

FIG. 5D is an electronic circuit that illustrates the working of the wearable ring device while rotating the rotatable interface over the optical sensor, according to the embodiments disclosed herein.

FIG. 6A-6C are schematic figures that illustrate the working of the wearable ring device while rotating the rotatable interface over the hall sensor, according to the embodiments disclosed herein.

FIG. 6D is an electronic circuit that illustrates the working of the wearable ring device while rotating the rotatable interface over the hall sensor, according to the embodiments disclosed herein.

FIG. 7A-7C are schematic figures that illustrate the working of the wearable ring device while rotating the rotatable interface over the pressure sensor, according to the embodiments disclosed herein.

Figure 7D:
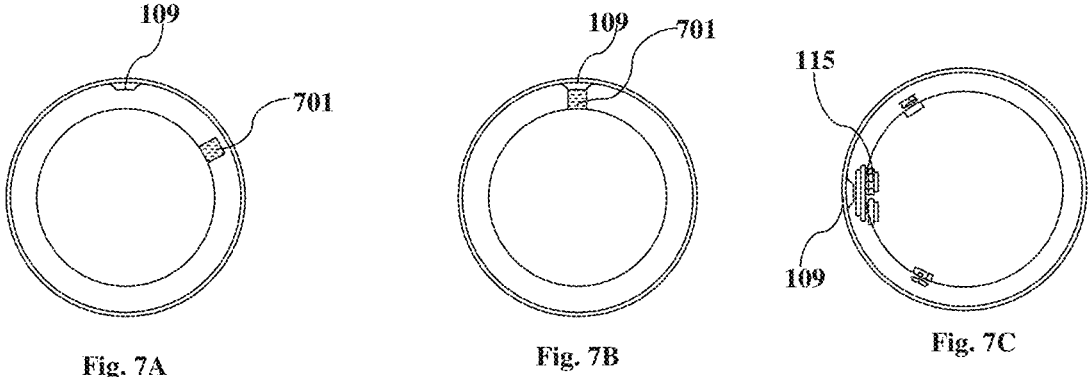
Figure 7D:
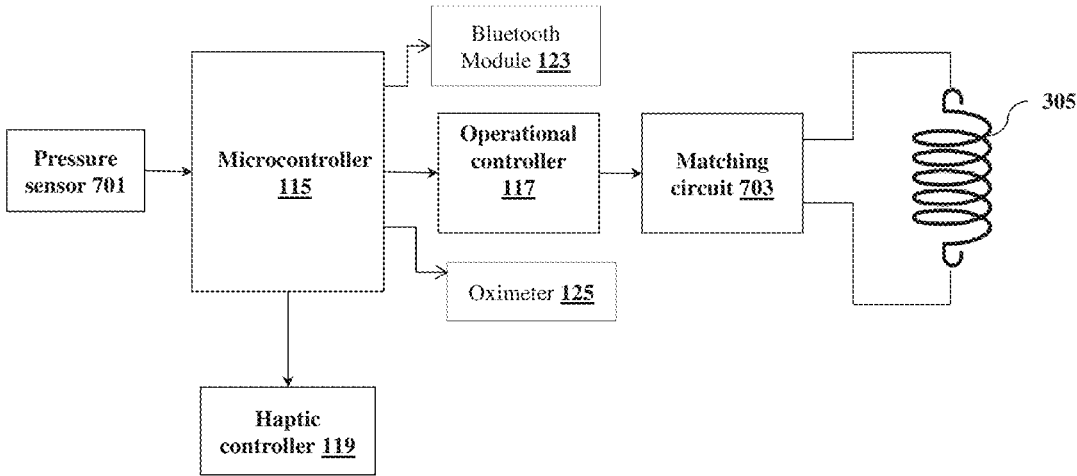

FIG. 7D is an electronic circuit that illustrates the working of the wearable ring device while rotating the rotatable interface over the pressure sensor, according to the embodiments disclosed herein.

FIG. 8 is a flow diagram that illustrates a method for performing one or more user defined operations using a wearable ring device according to the embodiments disclosed herein.

It may be noted that, to the extent possible, like reference numerals have been used to represent like elements in the drawing. Furthermore, those of ordinary skill in the art will appreciate that elements in the drawing are illustrated for simplicity and may not necessarily have been drawn to scale. For example, the dimensions of some of the elements in the drawing may be exaggerated relative to other elements to improve the understanding of aspects of the invention. Further, the elements may have been represented in the drawing by conventional symbols, and the drawings may show only those specific details that are pertinent to understanding the embodiments of the invention so as not to obscure the drawing with details that will be readily apparent to those of ordinary skill in the art having the benefit of the description herein.

DETAILED DESCRIPTION OF INVENTION

It may be noted that, to the extent possible, like reference numerals have been used to represent like elements in the drawing. Furthermore, those of ordinary skill in the art will appreciate that elements in the drawing are illustrated for simplicity and may not necessarily have been drawn to scale. For example, the dimensions of some of the elements in the drawing may be exaggerated relative to other elements to improve the understanding of aspects of the invention. Further, the elements may have been represented in the drawing by conventional symbols, and the drawings may show only those specific details that are pertinent to understanding the embodiments of the invention so as not to obscure the drawing with details that will be readily apparent to those of ordinary skill in the art having the benefit of the description herein.

As is traditional in the field, embodiments are described and illustrated in terms of blocks that carry out a described function or functions. These blocks, which are referred to herein as managers, units, modules, hardware components, or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware and software. The circuits, for example, may be embodied in one or more semiconductor chips or on substrate supports such as printed circuit boards and the like. The circuits constituting a block may be implemented by dedicated hardware or by a processor (e.g., one or more programmed microprocessors and associated circuitry) or by a combination of dedicated hardware to perform some functions of the block and a processor to perform other functions of the block. Each block of the embodiments may be physically separated into two or more interacting and discrete blocks without departing from the scope of the proposed method. Likewise, the blocks of the embodiments may be physically combined into more complex blocks without departing from the scope of the proposed method.

The accompanying drawings are used to help easily understand various technical features, and it is understood that the embodiments presented herein are not limited by the accompanying drawings. As such, the proposed method is construed to extend to any alterations, equivalents, and substitutes in addition to those which are particularly set out in the accompanying drawings. Although the terms "first," "second," etc. are used herein to describe various elements, these elements are not limited by these terms. These terms are generally used to distinguish one element from another.

Accordingly, the embodiments discloses a wearable ring device to perform a communication operation in a wireless network. The wearable ring device comprises a control unit, a static component and a rotatable interface. The control unit comprises a microcontroller, a haptic controller and a power source. The static component is placed over the control unit and the static component includes at least one sensing element placed over an outer surface of the static component. Further, the rotatable interface mounted over the static component and is rotatable over an axis of the static component. The rotatable interface comprises a notch and the notch is provided at an inner surface of the rotatable component. Further, when the rotatable interface is rotated over the static component, the conductive notch comes in contact with the sensing element, the microcontroller determines a change in an electric or magnetic or optical parameter of the sensing element when the rotatable interface is in contact with the static component and performs the communication operation based on the change in the electric or magnetic or optical parameter of the sensing element.

Accordingly, the embodiment herein is to provide a method for performing communication operation includes determining, by a wearable ring device, a conductive notch of the rotatable interface of the wearable ring device is in contact with at least one sensing element of a static portion of the wearable ring device, when the rotatable interface is rotated over the static component. Further, the method includes determining, by the wearable ring device, a communication operation configured for the sensing element with which the conductive notch is in contact. Further, the method includes performing, by the wearable ring device, the communication operation.

The proposed invention provides rotatable interface that can provide an enhanced control mechanism to control various communication operations being performed by the wearable ring device. For example, when the rotatable interface is turned clockwise, a payment mode is enabled to perform communication operation using the wearable ring device. Similarly, when the rotatable interface is turned anti clockwise, the payment mode can be disabled. In an embodiment, the rotation of the rotatable interface can control various applications such as workout mode, emergency mode, access control mode, gaming mode, multimedia playback mode and the like.

The rotatable interface of the wearable ring device offers a tactile and responsive input method.

The proposed design of the wearable ring device is a revolutionary innovation in the field of wearable technology. The static component and rotatable interface of the wearable ring device make it unique and different from the conventional designs of wearable rings. The rotatable interface can be seamlessly integrated into the design of the wearable ring device, making it compact and ergonomic. This design ensures that the wearable ring device is comfortable to wear, and the user can easily interact with it. The rotatable interface of the wearable ring device can be configured to perform different functions depending on the context or application. This feature provides flexibility and adaptability to the user's preferences and needs. The user can customize the device according to their requirements, making it a personalized and user-friendly device. Further, the wearable rings are often exposed to various environmental conditions such as moisture, dust, or physical impact. The rotatable interface of the device can be designed to be durable and resistant to wear and tear, ensuring reliable performance over time. This feature makes the device long-lasting and cost-effective.

Figure 1:
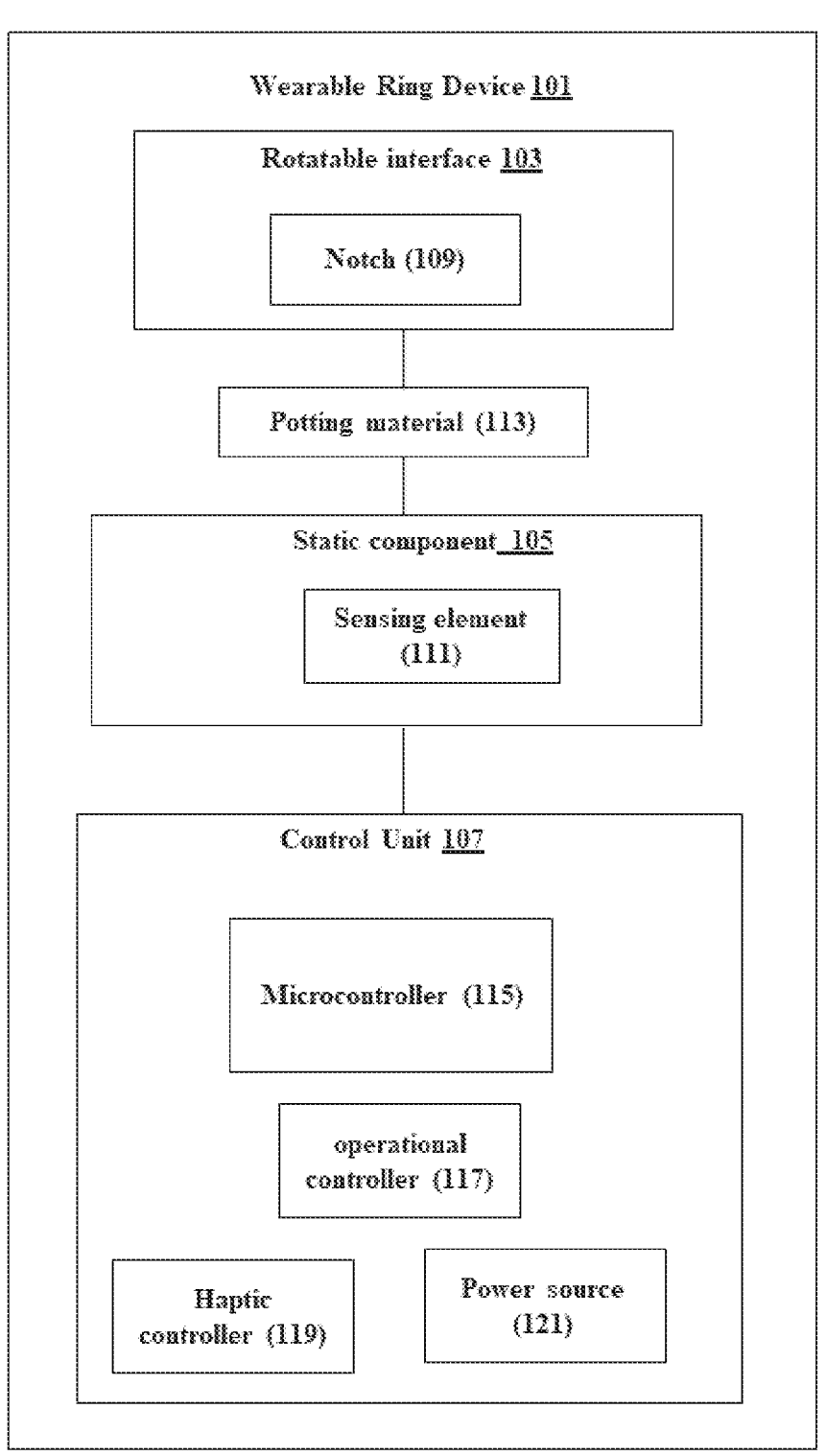
FIG. 1 is a block diagram that illustrates a wearable ring device, according to the embodiments disclosed herein.

FIG. 1 is a block diagram that illustrates a wearable ring device, according to the embodiments disclosed herein.

The wearable ring device (101) comprises a rotatable interface (103), a static component (105), and an control unit (107). The rotatable interface (103) comprises a notch (109) on the inner surface of the rotatable interface (103). The wearable ring device (101) is a small electronic device that is designed to be worn on the finger like the conventional ring. The wearable ring device (101) can be used to perform various functions such as fitness tracking, providing notifications, performing NFC communication, controlling other devices, and the like. Further, the rotatable interface (103) can be physically connected to the wearable ring device (101) using springs, clips and the like. In an embodiment, magnets can be used to attach the rotatable interface (103) to the wearable ring device (101). The magnets provide a strong connection while still allowing the rotatable part to rotate freely when manipulated by the user. In another embodiment, the rotatable interface (103) can be electronically connected to the wearable ring device (101) that allows it to perform several touch-sensitive controls and provide haptic feedback when the rotatable interface (103) is rotated. This enables seamless interaction between the rotatable interface (103) and the wearable ring device (101).

The rotatable interface (103) is mounted over the static component (105) and can be rotated over the axis of the wearable ring device (101). Also, the rotatable interface (103) can be rotated in at least one of the clockwise or the anti-clockwise direction. Further, the rotatable interface (103) can act as an input interface through which the user can provide input to perform one or more communication operations using the wearable ring device (101). For example, the rotatable interface (103) can be rotated in a particular direction to enable the communication operation in the wearable ring device (101), and can be rotated in opposite direction to enable a workout mode in the wearable ring device. The rotatable interface can be made of at least a metallic material, non-metallic material or a semi-metallic material. For example, the rotatable interface (103) can be made up of Grade 2 Titanium with PVD coating.

Particularly, the rotatable interface (103) comprises a notch (109) on the inner surface, which is made of a conductive material. In an embodiment, the notch (109) can behave as a magnetic notch. In an embodiment, there can be one or more notches placed at the inner side of the rotatable part, and the notches can be arranged in a pattern to provide a unique identification code. Further, the notch is oriented perpendicular to the plane of the rotatable interface. The depth and the width of the notch (109) are uniform, and the notch can be formed using a laser or other suitable machining techniques.

The notch (109) ensures a proper alignment between the rotatable interface (103) and the static component (105). Particularly, the notch (109) can come in contact with the sensing elements (111) on the static component (105) when the rotatable interface (103) is rotated. The sensing elements (111) can be made of a conductive material and can be arranged in a pattern to correspond to the pattern of the notches on the rotatable interface (103). Further, when one or more of the sensing elements (111) and the notch (109) come in contact with each other, a circuit is completed, and a signal is sent to the control unit (107) of the wearable ring device (101).

The wearable ring device (101) can perform one or more communication operations based on the rotation made by the user. For example, the wearable ring device (101) can be used to control a smart home system, such as turning on/off lights, adjusting the temperature, or opening/closing doors. The control unit (107) of the wearable ring device (101) can be programmed to recognize different patterns of rotation and associate them with specific functions. Additionally, the wearable ring device (101) can be equipped with sensors to detect other types of movements, such as tapping or shaking, to provide additional control options. Also, the wearable ring device (101) comprises gyroscopes, accelerometer to perform the desired operation.

The static component (105) of the wearable ring device (101) has a circular outer profile maintaining a consistent and smooth outer surface that is likely designed for aesthetic appeal and comfort when worn. In addition, the static component (105) may be made of a durable and lightweight material such as titanium or carbon fiber to ensure longevity and ease of wear. The circular outer profile may also be designed to fit a variety of finger sizes and shapes. The static component (105) of the wearable ring device (101) is designed to fit snugly around the finger and also the inner surface of the static component (105) is smooth ensuring comfort for the wearer. The inner surface of the static component (105) may also be coated with a hypoallergenic material to prevent any allergic reactions or skin irritation. Additionally, the static component (105) may have a slightly curved inner surface to conform to the natural shape of the finger and provide a secure fit. The static component (105) has an engagement mechanism that interacts with conductive notches (109) on the rotatable part (103). The conductive notches (109) may be made of a conductive material such as copper or gold to ensure reliable electrical contact with the sensing elements (111) on the static component (105).

The static component (105) includes sensing elements (111). The sensing element (111) on the static component (105) comes in contact with the conductive notch (109) when the rotatable interface (103) is rotated over the static component (105). The sensing elements (111) may be arranged in a circular pattern around the inner surface of the static component (105) to ensure contact with the notches (109) on the rotatable interface (103) at any angle of rotation. The sensing elements (111) may also be designed to be highly sensitive to small changes in electrical conductivity to ensure accurate detection of the position and rotation of the rotatable interface (103). The sensing element (111) can be at least one of capacitive sensor (301), inductive sensor (401), hall sensor (601), optical sensor (501), pressure sensor (701). Also, the static component (105) can include sensors such as accelerometer, gyroscopes and the like. The accelerometer and the gyroscope are used to detect the movement/gesture of the hand of the user. The accelerometer and gyroscope are sophisticated sensors employed to detect the user's hand movements and gestures. When a user wishes to interact with the rotational user interface, they will perform a specific hand movement, positioning their palm, which is adorned with a ring, near or in front of their torso. As the user executes this movement, the accelerometer and gyroscope work in tandem to meticulously capture the nuances of the gesture. These sensors detect changes in the hand's acceleration and rotational motion, providing precise data on the hand's position and movement trajectory. This captured data is then interpreted to recognize the user's intent to engage with the rotational user interface. Essentially, the specific hand gesture serves as a command signal, indicating that the user wants to activate and use this unique interface mode. This seamless interaction between the user's gesture and the sensor technology enables a fluid and intuitive user experience.

The potting material (113) is present between the static component (105) and the rotatable interface (103). The potting material (113) is a protective material surrounding the static component (105). The potting material (113) can act as a dielectric material that influences the capacitance values that change with the proximity or touch used in capacitive sensors (301). Also, the dielectric material provides an insulation between the conductive components of the wearable ring device (101) that prevents the short circuits and ensures the proper functioning of the wearable ring device (101). Also, the dielectric strength of the potting material is greater than 3. The potting material (113) can be made up of polymer, silicone rubber, ceramics, glass and the like. Further, the potting material (113) withstands the high voltages without breaking down, ensures the minimal energy loss in the form of heat, thus maintaining the efficiency of the wearable ring device (101). Also, the potting material (113) is flexible and ensures biocompatibility.

The control unit (107) of the wearable ring device (101) is placed over the rotatable interface (103). The control unit (107) comprises a microcontroller (115), an operational controller (117), a haptic controller (119) and a power source (121). The microcontroller (115) determines an activation of the sensing element. The activation of the sensing element is determined when there is a change in the level of electric or magnetic or optical parameter of the sensing element that is occurred when notch comes in contact with the sensing element. The determination is performed when the microcontroller (115) receives input signals from the sensing elements (111) indicating the position of the notch (109) with respect to the sensing elements (111), when the rotatable interface (103) is rotated. Upon receiving the input signals, the microcontroller (115) determines the one or more communication operations to be performed based on the input signals received. The one or more communication operations can include but not limited to a payment function, workout, music control, health monitoring, smart home control, silent/Do not Disturb, emergency function, find my phone function. Further, the microcontroller (115) transmits the controls signals to at least one of the operational controller (117), a Bluetooth module (123) and a oximeter (125) to perform the one or more communication operation with the external paired device. Particularly, the Bluetooth module (123) can enable a wireless communication with external devices to perform one or more communication operation. The Bluetooth module (123) can transmit data such as fitness metrics like heart rate, steps and the like to the external mobile device that is wirelessly connected to the wearable ring device. Also, the Bluetooth module (123) can receive notifications from the paired device and further can be used to provide haptics feedbacks based on the received notifications. Also, the oximeter (125) can measure the heart rate and oxygen levels of the user wearing the wearable ring device. Further, the measured heath metrics can be communicated to the paired mobile device using the Bluetooth module (123). Also, the microcontroller (115) sends the control signals to the haptic controller (119) to provide the haptic feedback or alerts to the user indicating a feedback for the user input received. For example, the haptic controller (119) can provide the haptic feedback in the form of vibrations, sound and the like. The power source (121) supplies power to the wearable ring device (101), enabling the wearable ring device (101) to perform one or more communication operations. Also, the power source (121) regulates the voltage and current supplied to various components of the wearable ring device (101) ensuring they receive the necessary power levels and thus maximizing the battery life.

FIG. 2A is a schematic figure that illustrates a side view of the wearable ring device, according to the embodiments disclosed herein.

The wearable ring device (101) comprises the static component (105) and the rotatable interface (103) placed over the static component (105). The rotatable interface (103) can be rotated over the static component (105). One of the most interesting features of the wearable ring device is that it can perform one or more functions based on the rotation of the rotatable part. This means that users can interact with the device in a more intuitive and natural way, simply by rotating the ring on their finger. For example, the wearable ring device could be programmed to control the volume of a music player, adjust the brightness of a display, or even navigate through a virtual reality environment.

Another advantage of the wearable ring device is its compact size and portability. Unlike other wearable devices such as smartwatches or fitness trackers, the ring can be worn discreetly on the finger, making it ideal for situations where a larger device would be impractical or inappropriate. Additionally, the device is lightweight and comfortable to wear, ensuring that users can wear it for extended periods without experiencing any discomfort.

FIG. 2B is a schematic figure that illustrates a rotatable interface of the wearable ring device, according to the embodiments disclosed herein.

The rotatable interface (103) is a key component of the ring that allows for a range of functions and features. The notch (109) on the inner surface of the rotatable part is an important aspect of the design that enables the ring to function properly.

The notch (109) is oriented perpendicular to the plane of the rotatable part, which means that it is positioned at a right angle to the surface of the ring. This orientation is critical to the proper alignment and interaction between the rotatable interface and other components of the wearable ring device (101).

In addition to its functional benefits, the rotatable interface (103) of the wearable ring device (101) is also aesthetically pleasing. The design is sleek and modern, with clean lines and a minimalist aesthetic. The rotatable interface (103) is also available in a range of colors and finishes, allowing users to customize their ring to suit their personal style. For example, the user can engrave their names on the outer surface of the wearable ring device (101).

Overall, the wearable ring device (101) disclosed herein is a unique and innovative piece of technology that combines functionality with style. The rotatable part is a key component of the design, providing both functional and aesthetic benefits. With its versatile features and customizable design, the wearable ring device (101) is sure to be a popular choice for tech-savvy consumers looking for a stylish and functional accessory.

FIG. 2C is a schematic figure that illustrates a static component of the wearable ring device, according to the embodiments disclosed herein.

The static component (105) includes the sensing elements (111) which detects the position or the angle of the rotatable interface (103) relative to the static component (105). The sensing elements (111) sends the input signal to the microcontroller (115) indicating the contact with the notch (109) with respect to the sensing elements (111). The sensing elements (111) can include but are not limited to the capacitive sensor (301), the inductive sensor (401), the optical sensor (501), the pressure sensor (701), and the hall sensor (601). Each of these sensors has its own unique advantages and disadvantages, and the choice of sensor will depend on the specific requirements of the application.

In particular, the capacitive sensor is a highly effective sensor for detecting the position of the notch (109) during the rotation of the rotatable interface (103). This sensor works by detecting changes in capacitance as the conductive notch (109) moves, providing precise information about its position. The capacitive sensor (301) detects the change in the capacitance as the conductive notch (109) is moved during the rotation of the rotatable interface (103), thus providing the precise information about the position of the conductive notch (109). Further, the capacitive sensor (301) transmits the input signal to the microcontroller (115), when the determined capacitance fluctuates from a predefined threshold value indicating that conductive notch (109) is in contact with the one or more capacitive sensor (301).

Similarly, the inductive sensor (401) detects the change in the inductance caused due to the rotation of the rotatable interface (103), providing precise information about the position of the notch (109). Further, the inductive sensor (401) transmits the input signal to the microcontroller (115), when the determined inductance fluctuates from a predefined threshold value indicating that notch (109) is in contact with the one or more inductive sensor (401).

The inductive sensor (401) works on the principle of electromagnetic induction, where a change in the magnetic field around a conductor induces a voltage in the conductor. This voltage is then measured by the sensor and converted into a position signal that can be used to control the movement of the machine or device. In the proposed invention, the inductive sensor (401) is used to detect the position of the notch (109) in the rotatable interface (103). The notch (109) is a small notch or groove in the rotatable interface that is designed to interact with the inductive sensor (401). As the rotatable interface rotates, the notch (109) moves in and out of contact with the inductive sensor (401), causing a change in the inductance of the sensor. This change in inductance is then detected by the sensor and transmitted to the microcontroller (115) as an input signal. The microcontroller (115) receives the input signal from the inductive sensor (401) and processes it to determine the precise position of the notch (109).

In an embodiment, the optical sensor (501) detects the change in the patterns or markings on the rotatable interface (103) due to the rotation of the rotatable interface (103), providing the precise information about the position of the notch (109). The use of optical sensors (501) in this embodiment provides a reliable and accurate means of detecting the optical path of a light emitted by LED-PD pair on the rotatable interface (103). By detecting the change in the optical path, the optical sensor (501) is able to provide precise information about the position of the notch (109) with a high degree of accuracy. Further, the optical sensor (501) transmits the input signal to the microcontroller (115), when the determined angular position fluctuates from a predefined threshold value indicating that notch (109) is in contact with the one or more optical sensor (501).

In an embodiment, the pressure sensor detects the change in the pressure caused due to the rotation of the rotatable interface (103), providing the precise information about the position of the notch (109). Further, the pressure sensor (701) transmits the input signal to the microcontroller (115), when the determined pressure fluctuates from a predefined threshold value indicating that notch (109) is in contact with the one or more pressure sensor (701). The use of pressure sensors (701) in the detection of the change in pressure caused by the rotation of a rotatable part has become increasingly popular in the field of technology. This is because pressure sensors (701) provide precise information about the position of the notch, which is essential in the operation of various devices. The pressure sensor (701) is designed to detect the slightest change in pressure, which is then transmitted to the microcontroller for processing.

One of the advantages of using pressure sensors (701) is that they are highly sensitive and accurate. This means that they can detect even the slightest change in pressure, which is essential in the operation of various devices. Additionally, pressure sensors (701) are highly reliable, which ensures that the information they provide is accurate and consistent.

In an embodiment, the hall sensor (601) detects the magnetic field caused due to the rotation of the rotatable interface (103), providing the precise information about the position of the magnetic notch (109). Further, the hall sensor (601) transmits the input signal to the microcontroller (115), when the determined magnetic field fluctuates from a predefined threshold value indicating that magnetic notch (109) is in contact with the one or more hall sensor. This threshold value is set to ensure that the magnetic notch (109) is in contact with the one or more hall sensors before the microcontroller (115) receives the input signal. This helps to ensure that the system operates smoothly and accurately, without any errors or malfunctions.

In an embodiment, the hall sensor detects the presence of a magnetic field. When a magnetic field is present, the hall sensor (601) generates a voltage proportional to the strength of the magnetic field. This voltage is then used to determine the position of the magnetic notch (109) with high accuracy. When the magnetic notch (109) comes in contact with the hall sensor (601), it completes an electrical circuit, which generates an input signal that is transmitted to the microcontroller (115). The microcontroller (115) receives the input signal from the hall sensor and processes it to determine the position of the conductive notch (109). The microcontroller (115) is programmed to compare the input signal with a predefined threshold value. If the input signal is above the threshold value, the microcontroller (115) determines that the magnetic notch (109) is in contact with the hall sensor and takes appropriate action.

FIG. 2D is a schematic figure that illustrates a dielectric part placed between the static component and rotatable interface, according to the embodiments disclosed herein. The potting material (113) is placed between the static component (105) and the rotatable interface (103). The potting material (113) can act as a dielectric material that influences the capacitance values that change with the proximity or touch used in capacitive sensors (301). The potting material (113) can provide an insulation between the conductive components of the wearable ring device (101) that prevents the short circuits and ensuring the proper functioning of the wearable ring device (101).

FIG. 2E is a schematic figure that illustrates a front view of the wearable ring device, according to the embodiments disclosed herein. The wearable ring device (101) comprises a rotatable interface (103) that is rotated over the static part. The rotatable interface (103) is designed to rotate in a smooth and seamless manner, allowing the user to easily rotate the ring without any resistance or friction. The rotatable interface (103) of the wearable ring device (101) is designed to be highly durable and resistant to wear and tear. The rotatable interface (103) is made of a high-quality material that is able to withstand the rigors of daily use. Additionally, the rotatable interface (103) is designed to be lightweight and comfortable to wear, ensuring that the user can wear the ring device (101) for extended periods of time without experiencing any discomfort or fatigue. The static component (105) of the wearable ring device (101) is designed to securely hold the rotatable interface (103) in place. The static component (105) is made of a strong and sturdy material that is able to withstand the forces exerted on it during use.

FIG. 2F is a schematic figure that illustrates a top view of the rotatable interface on the wearable ring device, according to the embodiments disclosed herein. The rotatable interface (103) is designed to be easily rotated by the user's finger, and it comprises the notch (109) on the inner surface to provide a better grip. Additionally, the rotatable interface (103) is made of a conductive material to facilitate the detection of changes in the sensing measurement. Furthermore, the static component (105) comprises the sensing elements (111) to detect the change in the sensing measurement when the rotatable interface (103) is rotated over the static component (105). The sensing elements are arranged in a specific pattern to ensure accurate detection of the rotation of the rotatable part. In operation, when the user rotates the rotatable interface (103) over the static part (105), the sensing elements (111) detect the change in the sensing measurements caused by the rotation. The sensing measurements can include, but not limited to a capacitance, inductance, magnetic field, and pressure value.

FIG. 2G is a schematic figure that illustrates a bottom view of the rotatable interface with a capacitive sensor (301) and microcontroller (115) according to the embodiments disclosed herein. The microcontroller (115) receives input signals from the sensing elements (111) indicating the position of the notch with respect to the sensing elements (111), when the rotatable interface (103) is rotated.

FIG. 2H is a schematic figure that illustrates a trackpad bottom view of the static component, according to the embodiments disclosed herein. The trackpad is a part of the static component (105). The notch (109) contacts the sensing elements (111) through the trackpad (201). The trackpad (201) comprises a haptic controller (119), sensing elements (111), a switching controller and a Operational controller (117). The rotatable interface (103) moves over the trackpad (201) of the static part (105), which results in performing one or more functions, when the notch (109) comes in contact with the sensing element (111).

FIG. 2I is a schematic figure that illustrates a side view of the trackpad, according to the embodiments disclosed herein.

FIG. 3A-3C are schematic figures that illustrate the working of the wearable ring device while rotating the rotatable interface over the capacitive sensor (301), according to the embodiments disclosed herein.

FIG. 3D is an electronic circuit that illustrates the working of the wearable ring device while rotating the rotatable interface over the capacitive sensor (301), according to the embodiments disclosed herein.

The wearable ring device (101) comprises the static component (105) and the rotatable interface (103). The static component (103) can include the one or more capacitive sensor (301) (For example the capacitive sensing pad as shown in FIG. 3A) and the potting material (113) as shown in FIG. 3A. The rotatable interface (103) comprises a notch (109) on its inner surface, as shown in FIG. 3A. One or more capacitive sensors (301) determine the change in capacitance as the rotatable interface (103) is rotated over the static component (105). The change in capacitance detected indicates the position of the notch (109) with respect to the one or more capacitive sensors (301). Furthermore, when the change in capacitance exceeds the predefined threshold value, the one or more capacitive sensors determine that it has come in contact with the notch (109), as shown in FIG. 3B. Upon determining contact with the notch (109), the one or more capacitive sensors (301) send input signals to the microcontroller (115) indicating to perform one or more communication operations based on the rotation made by the user, as shown in FIG. 3C.

Further, the microcontroller (115) determines the one or more communication operation to be performed based on the input signals received from the one or more capacitive sensors (301), as shown in FIG. 3D. Upon determining the one or more communication operations, the microcontroller (115) sends signals to the at least one oximeter (125), Bluetooth module (123), operational controller (117) to matching circuit (303) perform communication operation. Furthermore, the microcontroller (115) sends control signals to the haptic controller (119). The haptic controller (119) provides haptic feedback to the users indicating the enablement or disablement of the User defined operation mode.

FIG. 4A-4C are schematic figures that illustrate the working of the wearable ring device while rotating the rotatable interface over the inductive sensor (401), according to the embodiments disclosed herein.

FIG. 4D is an electronic circuit that illustrates the working of the wearable ring device while rotating the rotatable interface over the inductive sensor (401), according to the embodiments disclosed herein.

The wearable ring device (101) consists of a static component (105) and a rotatable interface (103). The static component (105) can include one or more inductive sensors (401) (For example, an inductive coil is shown in FIG. 4A). The rotatable interface (103) has a notch (109) on its inner surface, as shown in FIG. 4A. One or more inductive sensors (401) determine the change in inductance as the rotatable interface (103) is rotated over the static component (105). The change in inductance detected indicates the position of the notch (109) with respect to the one or more inductive sensors (401). Furthermore, when the change in inductance fluctuates from the predefined threshold value, the one or more inductive sensors (401) determine that it has come in contact with the notch (109), as shown in FIG. 4B. Upon determining the contact with the notch (109), the one or more inductive sensors (401) send input signals to the microcontroller (115), indicating to perform one or more communication operation based on the rotation made by the user, as shown in FIG. 4C.

Additionally, as shown in FIG. 4D, the microcontroller (115) determines the one or more communication operations to be performed based on the input signals received from the one or more inductive sensors (401). Upon determining this, the microcontroller (115) sends signals to the at least one of Bluetooth module (123), oximeter (125), operational controller (117) to matching circuit (403) perform communication operation. The Operational controller (117) performs the user defined operation through the antenna (305). Also, the microcontroller (115) sends control signals to the haptic controller (119). The haptic controller (119) provides haptic feedback to the users indicating the enablement or disablement of the User defined operation mode.

FIG. 5A-5C are schematic figures that illustrate the working of the wearable ring device while rotating the rotatable interface over the optical sensor (501), according to the embodiments disclosed herein.

The wearable ring device (101) comprises a static component (105) and a rotatable interface (103). The static component (105) includes one or more optical sensors (501)

(e.g: LEDs-PD pair) as shown in FIG. 5A. The rotatable interface (103) has a notch (109) on its inner surface, which is detected by the optical sensors (501) as it rotates over the static component (105).

The one or more optical sensors (501) detect changes in the optical path emitted by the LED-PD pair on the rotatable interface (103) as it rotates over the static part (105). These changes indicate the position of the notch (109) with respect to the optical sensors (501). When the optical sensors (501) detect contact with the notch (109), they send input signals to the microcontroller (115) as shown in FIG. 5B. The microcontroller (115) then performs one or more communication operation based on the rotation made by the user as shown in FIG. 5C.

FIG. 5D is an electronic circuit that illustrates the working of the wearable ring device while rotating the rotatable interface over the optical sensor (501), according to the embodiments disclosed herein.

The microcontroller (115) determines the specific functions to be performed based on the input signals received from the optical sensors (501). For example, the microcontroller (115) may send signals to the at least one of the oximeter (125), Bluetooth module (123), Operational controller (117). Further, the operational controller (117) to matching circuit (503) performs communication operation through the antenna (305). Additionally, the microcontroller (115) may send control signals to the haptic controller (119) to provide haptic feedback to the user indicating the enablement or disablement of the communication operation mode.

The wearable ring device (101) can perform one or more operations, such as contactless payments, access control, and data transfer. The optical sensors (501) can be configured to detect the change in the optical path of the light to perform the communication operation. The potting material (113) can be made of a material that is transparent to the optical sensors (501), such as glass or plastic. The haptic feedback provided by the haptic controller (119) can be customized based on the specific function being performed by the wearable ring device.

FIG. 6A-6C are schematic figures that illustrate the working of the wearable ring device while rotating the rotatable interface over the hall sensor (601), according to the embodiments disclosed herein.

FIG. 6D is an electronic circuit that illustrates the working of the wearable ring device while rotating the rotatable interface over the hall sensor (601), according to the embodiments disclosed herein.

The wearable ring device (101) comprises a static component (105) and a rotatable interface (103). The static component (105) can include one or more hall sensors (601) (hall sensors (601) are interchangeably used as hall effect sensor (601), such as magnetic coils, as shown in FIG. 6A. The rotatable interface (103) comprises a notch (109) on its inner surface as shown in FIG. 6A.

The one or more hall sensors in the static part (105) generates a voltage as the magnetic rotatable interface (103) is rotated over the static part (105). The voltage generated indicates the position of the notch (109) with respect to the one or more hall sensors (601). The change in the magnetic field indicates that one or more hall sensors (601) have come in contact with the notch (109) as shown in FIG. 6B.

Upon determining the contact with the notch (109), the one or more hall sensors (601) send input signals to the microcontroller (115) indicating to perform one or more communication operations based on the rotation made by the user as shown in FIG. 6C. The microcontroller (115) determines the one or more communication operations to be performed based on the input signals received from the one or more hall sensor (601), as shown in FIG. 6D.

The microcontroller (115) sends signals to the at least one of the Bluetooth module (123), oximeter (125), operational controller (117) to matching circuit (603) perform communication operation. The Operational controller (117) performs the communication operation through the antenna (305). Additionally, the microcontroller (115) sends control signals to the haptic controller (119). The haptic controller (119) provides haptic feedback to the users indicating the enablement or disablement of the communication operation mode.

FIG. 7A-7C are schematic figures that illustrate the working of the wearable ring device while rotating the rotatable interface over the pressure sensor (701), according to the embodiments disclosed herein.

The wearable ring device (101) comprises a static part (105) and a rotatable part (103). The static part (105) includes one or more pressure sensors (701), such as a strain gauge, to insulate the sensors. The rotatable interface (103) has a notch (109) on its inner surface that interacts with the pressure sensors (701) as it rotates over the static part (105).

The one or more pressure sensors (701) in the static part (105) detect changes in pressure as the rotatable part (103) is rotated over it. These changes in pressure indicate the position of the notch (109) with respect to the one or more hall sensors (601). Additionally, the pressure sensors (701) detect when they come in contact with the notch (109), as shown in FIG. 7B. Once contact is made, the pressure sensors (701) send input signals to the microcontroller (115) to perform one or more functions based on the rotation made by the user, as shown in FIG. 7C.

FIG. 7D is an electronic circuit that illustrates the working of the wearable ring device while rotating the rotatable interface over the pressure sensor (701), according to the embodiments disclosed herein. The microcontroller (115) receives input signals from the pressure sensors (701) and determines the functions to be performed based on the rotation made by the user. The microcontroller (115) then sends signals to the at least one of a Bluetooth module (123), oximeter (125), Operational controller (117) to matching circuit (703) perform communication operation with an external NFC-enabled device through the antenna (305). The microcontroller (115) also sends control signals to the haptic controller (119), which provides haptic feedback to the user indicating the enablement or disablement of the communication operation mode.

The Operational controller (117) performs the communication operation using the antenna (305) in the static component (105) of the wearable ring device (101). The antenna (305) is used to transmit and receive wireless signals to and from the external device. The haptic controller (119) provides haptic feedback to the user to indicate whether the communication operation mode is enabled or disabled. This feedback can be in the form of vibrations or other tactile sensations that the user can feel.

FIG. 8 is a flow diagram that illustrates a method for performing one or more user defined operation using a wearable ring device according to the embodiments disclosed herein.

At block 801, the method includes determining a conductive notch of the rotatable interface of the wearable ring device is in contact with at least one sensing element of a static component of the wearable ring device, when the rotatable interface is rotated over the static component.

At block 803, the method includes determining a communication operation configured for the sensing element with which the conductive notch is in contact.

At block 805, the method includes performing the communication operation.

The various actions, acts, blocks, steps, or the like in the method are performed in the order presented, in a different order, or simultaneously. Furthermore, in some embodiments, some of the actions, acts, blocks, steps, or the like are omitted, added, modified, skipped, or the like without departing from the scope of the proposed method.

The foregoing description of the specific embodiments will fully reveal the general nature of the embodiments herein such that others can readily modify and/or adapt such specific embodiments for various applications without departing from the generic concept. Therefore, such adaptations and modifications are intended to be comprehended within the meaning and range of equivalents of the disclosed embodiments. It is to be understood that the phraseology or terminology employed herein is for the purpose of description and not of limitation. Thus, while the embodiments herein have been described in terms of preferred embodiments, those skilled in the art will recognize that the embodiments herein can be practiced with modifications within the scope of the embodiments as described herein.

What is claimed is:

1. A wearable ring device to perform a communication operation in a wireless network, comprises:
   a control unit comprises a microcontroller, a haptic controller and a power source;
   a static component placed over the control unit, wherein the static component comprises at least one sensing element placed over an outer surface of the static component;
   a rotatable interface mounted over the static component and is rotatable over an axis of the static component, wherein the rotatable interface comprises a notch, wherein the notch is provided at an inner surface of the rotatable interface; and
   a potting material between the static component and the rotatable interface, wherein the potting material behaves as a dielectric material when the sensing element is a capacitive sensor; and
   wherein when the rotatable interface is rotated over the static component, the notch comes in contact with the sensing element, and wherein the microcontroller determines a change in a level of electric or magnetic or optical parameter of the sensing element when the rotatable interface is in contact with the static component and performs the communication operation based on the change in the level of electric or magnetic or optical parameter of the sensing element.

2. The wearable ring device as claimed in claim 1, wherein the sensing element is one of the capacitive sensor, a magnetic sensor, an inductive sensor, an optical sensor, and a pressure sensor.

3. The wearable ring device as claimed in claim 1, wherein the notch is made of a conductive material that allows for the flow of electrical current from the power source.

4. The wearable ring device as claimed in claim 1, wherein performs the communication operation based on the change in the level of electric or magnetic or optical parameter of the sensing element comprises:
   determines whether the change in the level of electric or magnetic or optical parameter of the sensing element meets a predetermined threshold; and performs the communication operation based on the change in the level of electric or magnetic or optical parameter of the sensing element when the change in the level of electric or magnetic or optical parameter sensing element meets the predetermined threshold.

5. The wearable ring device as claimed in claim 1, wherein the capacitive sensor on the static component is associated with at least one a capacitive sensing pad, wherein the capacitive sensing pad:

generates a capacitance due to rotations of the rotatable interface over the static component, and determines a change in the capacitance.

6. The wearable ring device as claimed in claim 2, wherein the inductive sensor on the static component is associated with at least one inductive coil, wherein the at least one inductive coil:

generates an inductance due to rotations of the rotatable interface over the static component, and determines the change in the inductance from a predefined threshold value indicating the contact of the notch with the inductive sensor.

7. The wearable ring device as claimed in claim 2, wherein a hall sensor on the static component is associated with at least one hall-effect sensor, wherein the at least one hall-effect sensor:

generates a voltage due to rotations of the rotatable interface over the static component, and determines the change in magnetic field generated by the notch.

8. The wearable ring device as claimed in claim 2, wherein the optical sensor on the static component is associated with at least one LEDs-a PD pair to determine the change in an optical path of a light emitted by the LEDs, which is reflected back from to PD pair from conductive notch due the rotations of the rotatable interface over the static component.

9. The wearable ring device as claimed in claim 2, wherein the pressure sensor on the static component comprises a strain gauge attached to the static component, wherein the strain gauge:

measures a deformation of the static component caused by a pressure applied by the rotatable interface when the rotatable interface is rotated over the static component, wherein the deformation of the strain gauge causes a change in resistance that is determined by the pressure sensor; and determines the change in the resistance applied over the static component.

10. The wearable ring device as claimed in claim 1, wherein the communication operations comprises at least one of a payment operations, a workout operation, an emergency operation, an access control operation, a gaming operation, and a multimedia playback operation.

11. The wearable ring device as claimed in claim 1, wherein the rotatable interface is circular in shape with a radial thickness.

12. The wearable ring device as claimed in claim 1, wherein the potting material is a protective material surrounding the static component.

13. The wearable ring device claimed in claim 1, wherein the communication operation is performed only when a user is wearing the wearable ring device.

14. The wearable ring device as claimed in claim 1, wherein the haptic controller provides haptic feedback indicating enabling or disabling of the communication operation on the wearable ring device.

15. The wearable ring device as claimed in claim 1, wherein the power source supplies power to the wearable ring device to perform the communication operations.

16. The wearable ring device as claimed in claim 1, wherein the notch is at least one of a conductive notch or a magnetic notch.

17. A method for performing communication operation, comprises:

determining, by a wearable ring device, a conductive notch of a rotatable interface of the wearable ring device is in contact with at least one sensing element of a static component of the wearable ring device, when the rotatable interface is rotated over the static component, wherein a potting material between the static component and the rotatable interface, and wherein the potting material behaves as a dielectric material when the sensing element is a capacitive sensor;

determining, by the wearable ring device, a communication operation configured for the sensing element with which the conductive notch is in contact; and performing, by the wearable ring device, the communication operation.

18. The method as claimed in claim 17, wherein the sensing element is one of the capacitive sensor, a magnetic sensor, an inductive sensor, an optical sensor, and a pressure sensor.

19. The method as claimed in claim 17, wherein performing the communication operation comprises:

determining whether a change in a level of electric or magnetic or optical parameter of the sensing element meets a predetermined threshold; and performing the communication operation based on the change in the level of electric or magnetic or optical parameter of the sensing element when the change in the level of electric or magnetic or optical parameter of the sensing element meets the predetermined threshold.

20. The method as claimed in claim 17, wherein the capacitive sensor on the static component is associated with at least one a capacitive sensing pad comprises, wherein the capacitive sensing pad:

generating a capacitance due to rotations of the rotatable interface over the static component, and determining a change in the capacitance.

21. The method as claimed in claim 18, wherein the inductive sensor on the static component is associated with at least one inductive coil, wherein the at least one inductive coil comprises:

generating an inductance due to rotations of the rotatable interface over the static component, and determining a change in the inductance from a predefined threshold value indicating the contact of the conductive notch with the inductive sensor.

22. The method as claimed in claim 17, wherein a hall sensor on the static component is associated with at least one hall-effect sensor, wherein the at least one hall-effect sensor:

generating a voltage due to rotations of the rotatable interface over the static component, and determining a change in magnetic field generated by the notch.

23. The method as claimed in claim 18, wherein the optical sensor on the static component is associated with at least one LEDs-PD pair, wherein the LEDs-PD pair comprises:

determining a change in an optical path of a light emitted by the LEDs, which is reflected back from to PD pair from conductive notch due the rotations of the rotatable interface over the static component.

24. The method as claimed in claim 18, wherein the pressure sensor on the static component comprises a strain gauge attached to the static component, wherein the strain gauge:

measuring a deformation of the static component caused by a pressure applied by the rotatable interface when the rotatable interface is rotated over the static component, wherein the deformation of the strain gauge causes a change in resistance that is determined by the pressure sensor, and determining the change the resistance applied over the static component.

\* \* \* \* \*